(12) United States Patent
Myers (10) Patent No.: US 9,334,792 B2
(45) Date of Patent: May 10, 2016

(54) STRAIGHT SHAFT ROTARY ENGINE

(71) Applicant: Rotary Innovations, LLC, Richwood, KY (US)

(72) Inventor: Kent J. Myers, Magnolia, OH (US)

( * ) Notice: Subject to any disclaimer, the term of this patent is extended or adjusted under 35 U.S.C. 154(b) by 271 days.

(21) Appl. No.: 13/772,478

(22) Filed: Feb. 21, 2013

(65) Prior Publication Data
US 2013/0213346 A1 Aug. 22, 2013

Related U.S. Application Data

(60) Provisional application No. 61/633,851, filed on Feb. 21, 2012.

(51) Int. Cl.
*F02B 53/00* (2006.01)
*F02B 53/06* (2006.01)

(52) U.S. Cl.
CPC . *F02B 53/06* (2013.01); *Y02T 10/17* (2013.01)

(58) Field of Classification Search
CPC .... F02B 53/06; F02B 53/00; F02B 2730/015; Y02T 10/17; F16K 11/10; F16K 11/14; F16K 11/161
USPC ......... 123/241, 237, 248, 246, 247, 434, 225, 123/200; 418/243, 244, 246, 113, 118, 146, 418/148
See application file for complete search history.

(56) References Cited

U.S. PATENT DOCUMENTS

| | | | |
|---|---|---|---|
| 383,530 A | 5/1888 | Jarvis | |
| 445,318 A | 1/1891 | Leach | |
| 938,714 A * | 11/1909 | Schmidt | 418/142 |
| 1,180,200 A * | 4/1916 | Speese | 418/172 |
| 1,404,583 A * | 1/1922 | Coffelt | 123/224 |
| 1,655,738 A * | 1/1928 | Rasck | 418/139 |
| 2,473,785 A * | 6/1949 | Cate | 123/214 |
| 2,744,505 A * | 5/1956 | Sherman | 123/244 |
| 3,137,280 A | 6/1964 | Jacobson et al. | |
| 3,712,273 A | 1/1973 | Thomas | |
| 3,743,451 A * | 7/1973 | Chapman | 418/61.1 |
| 3,855,977 A | 12/1974 | Statkus | |
| 3,882,827 A | 5/1975 | Williams | |
| 3,978,825 A * | 9/1976 | Rogers | 123/244 |
| 3,985,477 A | 10/1976 | Antrim et al. | |
| 4,038,948 A | 8/1977 | Blackwood | |
| 4,086,881 A | 5/1978 | Rutten | |
| 4,100,664 A | 7/1978 | Straesser | |

(Continued)

FOREIGN PATENT DOCUMENTS

| | | | | |
|---|---|---|---|---|
| FR | 2754308 A1 | 4/1998 | | |
| JP | 61241420 A * | 10/1986 | ............ | F02B 53/00 |

*Primary Examiner* — Jorge Pereiro
*Assistant Examiner* — Jason T Newton
(74) *Attorney, Agent, or Firm* — Renner Kenner Greive Bobak Taylor & Weber (57) ABSTRACT

A straight shaft non-planetating rotary piston engine includes a housing and at least one rotating piston mounted for circular rotation about an axis within the housing. The piston and the housing define an expansible combustion chamber that produces at least one combustion events for every rotation of the piston about the axis. The invention also includes a moveable cylinder head having a profile roller. The profile roller cooperates with an open face profile impressed into a rotary encoder. The open face profile is configured to pull the cylinder head into near-contact with the rotating piston face, and the moveable cylinder head is spring biased to repel the moveable cylinder head away from the rotating piston face.

19 Claims, 10 Drawing Sheets

(56) References Cited

U.S. PATENT DOCUMENTS

| | | |
|---|---|---|
| 4,178,900 A | 12/1979 | Larson |
| 4,342,296 A * | 8/1982 | Williams ............... 123/228 |
| 4,782,656 A | 11/1988 | Hansen |
| 5,025,756 A | 6/1991 | Nyc |
| 6,129,068 A * | 10/2000 | Wingate, Jr. ............ 123/248 |
| 6,976,467 B2 | 12/2005 | Fantuzzi |
| 7,114,932 B1 | 10/2006 | Bassine |
| 7,137,365 B2 | 11/2006 | Maslen |
| 7,284,508 B2 * | 10/2007 | Dopke et al. ............ 123/41.56 |
| 7,308,884 B2 | 12/2007 | Tathuzaki |
| 7,500,463 B2 | 3/2009 | Shuba |
| 7,503,307 B2 | 3/2009 | Klassen et al. |
| 7,549,850 B2 | 6/2009 | Trapalis |
| 7,762,228 B2 | 7/2010 | Georgiev |
| 7,938,097 B2 | 5/2011 | Sparling |
| 2009/0000586 A1 * | 1/2009 | Tonery ............ 123/184.47 |

* cited by examiner

STRAIGHT SHAFT ROTARY ENGINE

CROSS REFERENCE TO RELATED APPLICATION

Pursuant to 37 C.F.R. §1.78(a)(4), this application claims the benefit of and priority to prior filed Provisional Application Ser. No. 61/633,851, filed Feb. 21, 2012, which is expressly incorporated herein by reference.

FIELD OF THE INVENTION

This invention relates to internal combustion engines. Specifically, the invention relates to non-planetating rotary piston engines.

BACKGROUND OF THE INVENTION

Reciprocating piston-based engines have provided satisfactory performance in a variety of applications. However, the design is not without shortcomings. Several of these limitations have motivated engineers to pursue engine designs that depart from the traditional reciprocating piston tradition.

First, the reciprocating piston engine can be relatively complex. The majority of economical models designed for automotive use have four or more pistons. Even lighter duty models, designated for low horsepower applications, still necessitate a number of valves, valve trains, valve cams, valve lifters, crankshaft and connecting rods, bearings, and the like. This duplication of power production elements (pistons), and related ancillary components, results in an increased probability of mechanical failure. In an eight cylinder embodiment for example, there are eight connecting rods that may crack, sixteen or more valves and connecting components that may fail, and other potential problematic occurrences exist.

Additionally the reciprocating piston engine often has a lower power to weight ratio than is needed or is provided by alternative designs. While some applications may be tolerant of additional engine mass, other applications may significantly benefit from lighter engines capable of producing comparable power. For example, race cars, All Terrain Vehicles (ATVs), snowmobiles, and the like become more agile with a reduced mass engine. Further, yard equipment and portable construction equipment benefit from the increased portability that accompanies a lighter engine.

The reciprocating engine design also suffers from inherent power inefficiencies. For example, at top dead center, significant power losses are experienced from the absence of any appreciable force vector being applied to the crankshaft. Additionally, most reciprocating designs require the exhaust valve to open when the power stroke is only partially completed. This results in lost potential energy being fully and effectively transferred to linear action of the piston. The requirement for an oil sump, and cooperating cooling means, can consume more than half of the engine's potential horsepower. Further, the relative difficulty involved in the starting of reciprocating engines necessitates keeping the engine running at idle when corresponding equipment (e.g., lawnmower, automobile) is temporarily stationary. This results in wasted fuel and unnecessary pollutant emissions.

The reciprocating piston engine is disadvantageously prone to catastrophic failure. Since reciprocating components endure extreme g-forces when abruptly changing from one linear direction to another (e.g., as a piston transitions from the compression stroke to the power stroke), the reciprocating piston engine is prone to catastrophic failure. A shattered connecting rod, broken timing chain, or other mechanical failure is capable of completely incapacitating the engine.

Other designs operate at diminished capacity when components fail. This feature is particularly beneficial in critical use applications, where advance notice of gradual demise (often referred to as Graceful Degradation) is preferred to instantaneous and complete failure of the engine. For example, it is desirable for a snowmobile to "limp" back to civilization, versus leaving its rider stranded in the wilderness.

Several rotary engine designs attempt to resolve the shortcomings of the reciprocating piston engine noted above, but many use excessively complex mechanisms or geometries to achieve their goals. For example, many use a variable rotary motion or "planetating" motion (e.g., the Wankel engine design) which often necessitates complex and non-uniform cylindrical piston bores. Therefore, there is a need for a lightweight, efficient, simple, and durable non-planetating (interchangeably referred to as "straight shaft") rotary engine.

SUMMARY OF THE INVENTION

The present invention provides a straight shaft non-planetating rotary piston engine including a housing and at least one rotating piston mounted for circular rotation about an axis within the housing. The piston and the housing define an expansible combustion chamber that produces at least one combustion event for every rotation of the piston about the axis. The invention also includes a moveable cylinder head having a profile roller. The profile roller cooperates with an open face profile impressed into a rotary encoder. The open face profile is configured to pull the cylinder head into near-contact with the rotating piston face, and the moveable cylinder head is spring biased to repel the moveable cylinder head away from the rotating piston face.

The present invention also provides a straight shaft non-planetating rotary piston engine including a housing and at least one rotating piston mounted for circular rotation about an axis within the housing. The piston and the housing define an expansible combustion chamber that produces at least two combustion events for every rotation of the piston about the axis. The invention also includes an air chamber configured to contain pressurized air, and the air of the pressurized air chamber is pressurized by the rotary action of the piston. The invention also includes a fuel chamber configured to contain fuel and a mixing body fluidically coupled to the air chamber and the fuel chamber and configured to maintain a stoichiometrically optimized ratio of the fuel to the air. The invention includes a throttle. The throttle is configured to regulate the mass and volume of the fuel and the air supplied to the expansible combustion chamber while maintaining the stoichiometrically optimized ratio.

An internal combustion engine having an expansible combustion chamber is provided. The engine includes an air component of a fuel/air combustible mixture including nitrogen at a first percentage and oxygen at a second percentage. It also includes nitrogen absorbing material disposed in a container fluidically coupled to the chamber, such that the air component passes through the nitrogen absorbing material prior to entering the chamber. The nitrogen absorbing material is operable to reduce the first percentage of the nitrogen to a third lower percentage and to increase the second percentage of the oxygen to a fourth higher percentage of the oxygen.

An internal combustion engine including a housing and a piston together defining a combustion chamber is provided. The engine also includes electrodes disposed in the housing at a position defining the combustion chamber. The engine further includes a spark generator electrically coupled to the electrodes and comprising a low-current high-voltage power supply energized by a direct current electrical source of less than or equal to approximately 9 volts.

A seal for a straight shaft, non-planetating, rotary piston engine of the type having a housing and a rotatable piston therein is provided. The seal is for sealing a combustion chamber formed between a surface of the housing and the piston. The seal has one or more ramped legs disposed in advance of a sealing edge of the seal. The ramped legs displace the seal and the sealing edge upon engagement with an obstruction encountered in advance of the sealing edge.

A method for starting a straight shaft, non-planetating, rotary piston engine having air of a fuel air supply at an interval pressure greater than an ambient pressure, a valve for passing the air of a fuel-air supply into a combustion chamber for combusting therein to rotate the engine, and a spark generator is provided. The method includes rotating the rotary piston to establish an expansible combustion chamber of sufficient volume to support a combustion event. The method also includes actuating the valve to inject the air of a fuel air supply into the expansible combustion. The method further includes energizing the spark generator to initiate the combustion event.

A valve for use with a straight shaft, non-planetating, rotary piston engine having a fuel/air supply at an interval pressure greater than an ambient pressure is provided. The valve includes a passageway fluidically coupling a first valve portion to a second valve portion. The first valve portion is configured to oppose the entry of air for use in combustion into said passageway from a first direction when said valve is relaxed, and said second valve portion is configured to oppose the entry of combustion products into said passageway from a second direction when said valve is relaxed. The first valve portion is further configured to allow the entry of air for use in combustion into said passageway from a first direction when said valve is exercised, and said second valve portion is further configured to allow the passage or air for use in combustion in said first direction when said valve is exercised.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to further describe the invention and its objectives and advantages.

DETAILED DESCRIPTION

The unique elements of the claimed invention result in enhanced simplicity, improved longevity, and superior energy efficiency in an internal combustion engine of the invention. The mechanical elements of embodiments of the invention will be explored first, with an explanation of operating principles following thereafter.

Figure 1:
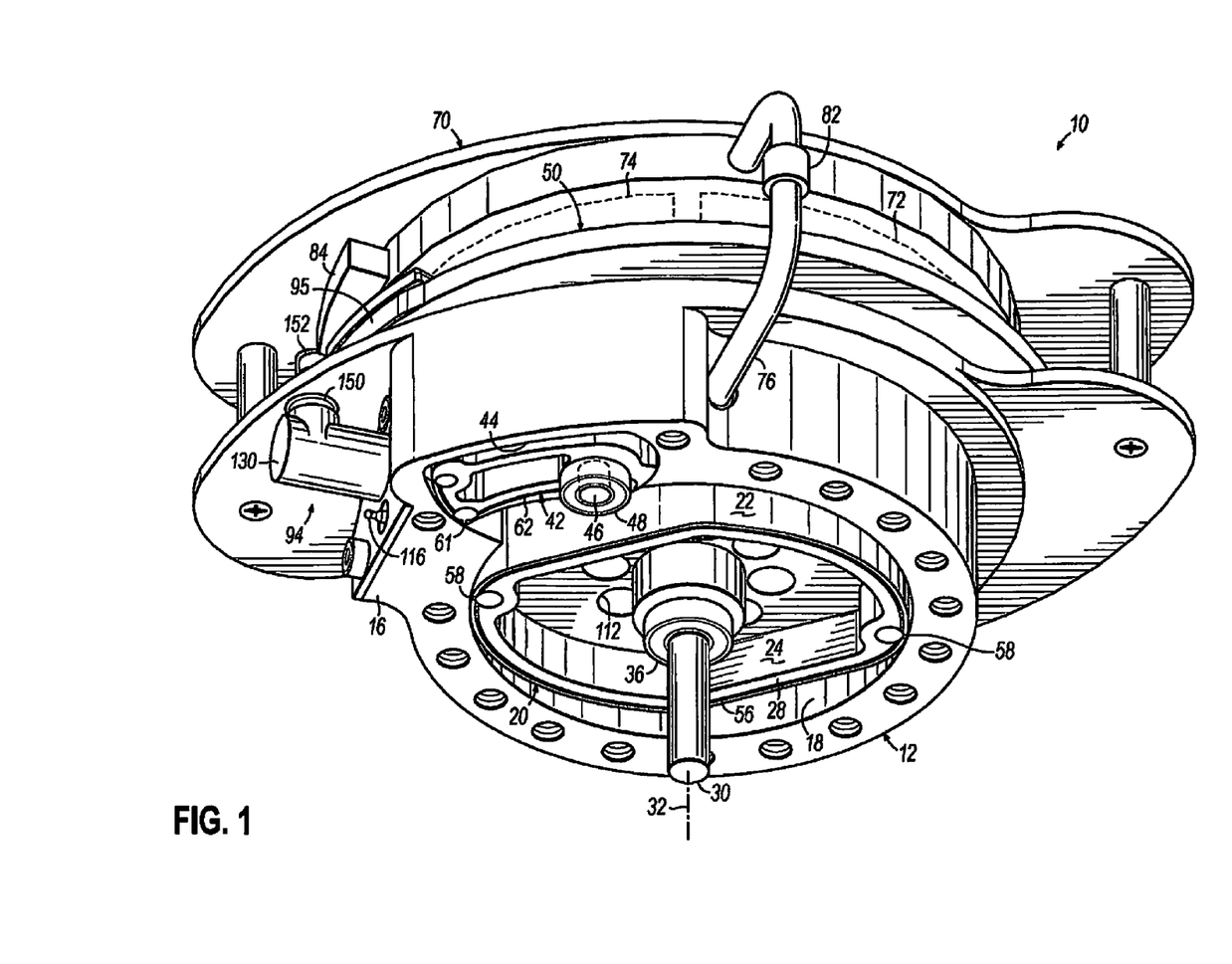
FIG. 1 is a perspective view of an embodiment of the invention, as seen with the top surface facing away from the viewer, with the lower cover removed.
Figure 2:
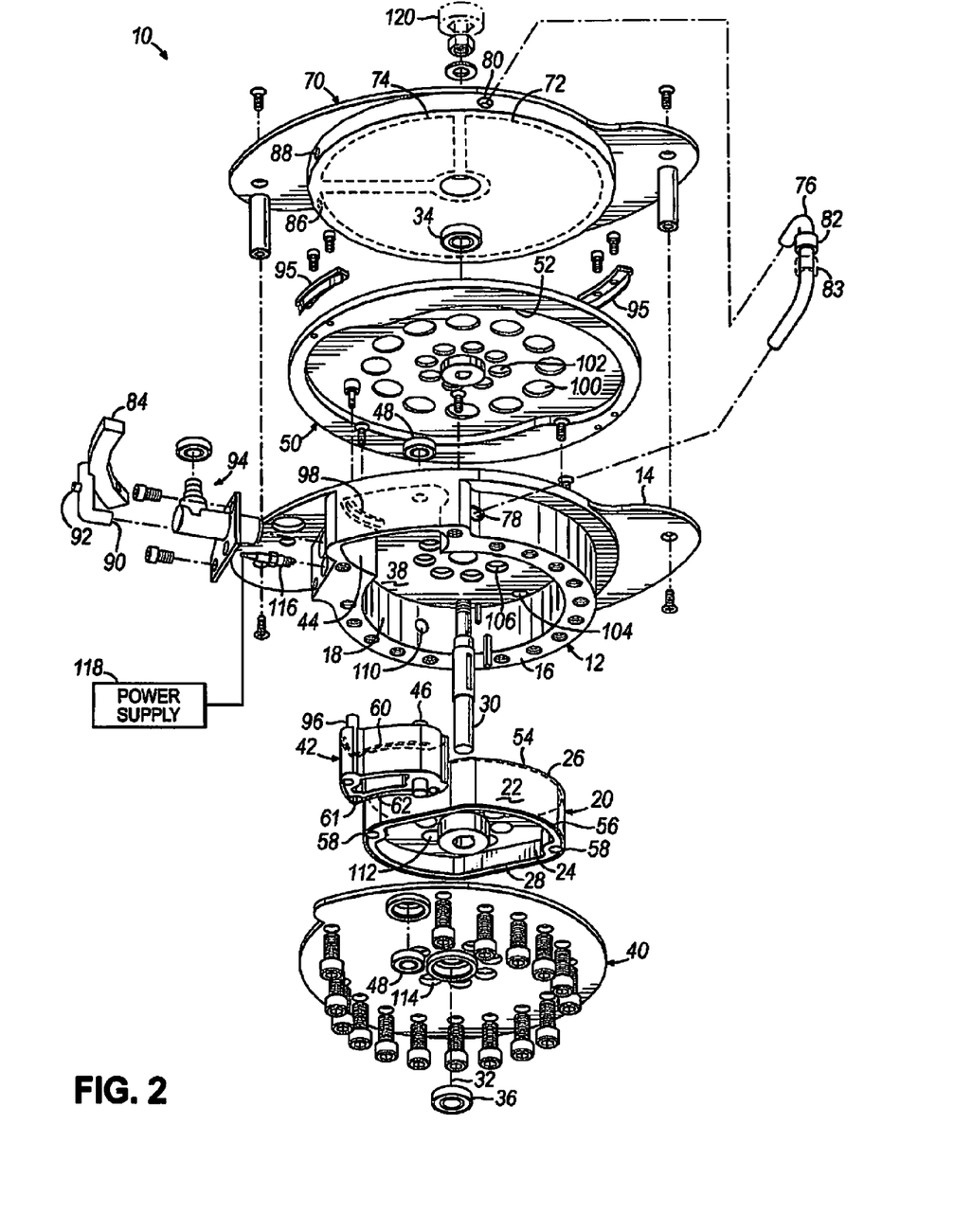
FIG. 2 is an exploded perspective view of an embodiment of the invention.

FIG. 1 depicts an assembled view of one embodiment of a non-planetating rotary piston engine 10 according to the invention. "Non-planetating" is meant to describe a piston that has a central rotational axis which is coincident with an axis of the engine during operation. Overall details are also illustrated in FIG. 2.

The engine 10 includes a housing 12 having a housing upper surface 14, a housing lower surface 16, and a bore 18. The housing upper surface 14 and the housing lower surface 16 are generally parallel to each other, and the bore 18 is generally cylindrical. The bore 18 is disposed perpendicularly through the housing lower surface 16 and through a portion of the housing 12 (i.e., the bore is blind with respect to the housing upper surface 14).

A rotary piston 20, having a piston face 22, a piston core 24, an upper piston edge 26 (not shown in FIG. 1, but depicted in FIG. 2), and a lower piston edge 28, is fixedly mated to a rotary shaft 30 that extends past the housing upper surface 14 and the housing lower surface 16. The rotary shaft 30 may interface with the rotary piston 20 using a key and slot configuration, a plurality of splines, or other means of preventing rotation of one component with respect to another component known to one of ordinary skill in the art. The rotary piston 20 and connected rotating shaft 30 are configured to rotate within the bore 18 about an axis 32, and the rotary shaft 30 and piston 20 are guided by an upper bearing 34 (not shown in FIG. 1, but depicted in FIG. 2) and a lower bearing 36. While the terms "upper" and "lower" are used herein refer to an engine 10 where rotary shaft 30 is vertically disposed, the rotary shaft 30 could be horizontally disposed or disposed at some other angle.

In one embodiment of the invention, the bearings 34 and 36 are sealed roller bearings. The rotary piston 20 is dimensioned such that it rotates near, but does not contact, the bore 18 or the bore face 38 or the lower cover 40 (not shown in this figure, but depicted in FIG. 2). This piston configuration may be interchangeably referred to as a "straight shaft rotary engine" or a "non-planetating rotary engine". This is distinguished from "planetating" or "eccentric rotary design" engines, wherein the center of the piston deviates from the center axis of the bore during operation.

A moveable cylinder head 42 is disposed within a cylinder head recess 44. In one embodiment, the moveable cylinder head 42 is pivotably mounted to the housing 12 with a pivot pin 46 and one or more cylinder head bearings 48, but other configurations and degrees of freedom may produce acceptable results. For example, the cylinder head 42 may linearly translate, or may move with a combination of rotation and translation. As the rotary piston 20 rotates about the axis 32 the moveable cylinder head 42 moves near, but does not touch, the piston face 22. A flywheel 50 is also fixedly mated to the rotary shaft 30 and rotates at the same angular speed as the rotary piston 20. As will be explained in greater detail below, an open face profile 52 (not shown in this figure, but depicted in FIG. 2) cooperates with the cylinder head 42 to maintain the moveable cylinder head 42 in near-contact with the piston face 22.

As noted earlier, several of the components are maintained in near-contact with each other. To ensure efficient operation of the engine (i.e, to reduce combustion gas blow-by), these gaps are spanned by a plurality of seals, which are analogous to piston rings of a reciprocating piston engine. A plurality of upper face seals 54 (not shown in this figure, but depicted in FIG. 2), lower face seals 56, apex seals 58, top cylinder head seals 60 (not shown in this figure, but depicted in FIG. 2), cylinder head apex seals 61, and lower cylinder head seals 62 serve to establish a substantially gas-tight seal between parts held in near contact. The noted seals, with the exception of the apex seals 58, are of the convention type known to one of ordinary skill in the art of rotary piston engines. Top and lower face seals may employ the profile and composition of seals manufactured by the Nissan Corporation for their series of rotary engines, or other similar seals dimensioned as appropriate to interface with the components of the engine 10. The design of the apex seals will be explained in greater detail below. As seen in FIG. 7F, seals are spring biased away from their respective mounting surfaces to provide a positive sealing interface and to effectively compensate for machining variations between opposing faces.

Turning attention to FIG. 2, a reservoir 70 is mounted in a fixed relationship to the housing 12, and disposed such that there is sufficient clearance to allow the flywheel 50 to rotate without obstruction. The reservoir 70 has an air chamber 72, and a fuel chamber 74 contained therein. An air conduit 76 fluidically couples a compression output port 78 that penetrates the housing 12, with a compression input port 80 that penetrates the wall of the reservoir 70 and terminates at the air chamber 72. A directionally restrictive valve 82 is disposed between the compression input port 80 and the compression output port 78, and the directionally restrictive valve 82 is coupled to each by the air conduit 76. As shown in FIG. 2, the directionally restrictive valve 82 is disposed at the midpoint of the air conduit 76, but acceptable results may be obtained by locating the directionally restrictive valve 82 at other locations, to include directly coupling the directionally restrictive valve 82 to the compression output port 78 or the compression input port 80. When properly oriented, the directionally restrictive valve 82 will allow air to pass from the compression output port 78 to the compression input port 80, but will prevent the flow of air from the compression input port 80 to the compression output port 78. The restrictive valve 82 may be a check valve of the ball type, flapper type, plunger type or other configuration known to one of ordinary skill in the art.

A mixing body 84 is coupled to the reservoir 70. The mixing body 84 subsumes a fuel output port 88 and an air output port 86 that penetrate the body of the reservoir 70 and terminate at the fuel chamber 74 and air chamber 72, respectively. The mixing body includes appropriately dimensioned internal orifices which combine gaseous fuel (e.g., propane, natural gas, hydrogen, etc.) at a stoichiometrically optimized ratio. When the engine 10 is used with liquid fuels (e.g., gasoline) the mixing body 84 may be substituted with a throttle body and fuel injector known to one of ordinary skill in the art. Alternatively, the mixing body 84 may be omitted, and direct port injection may be implemented.

The mixing body 84 terminates at a mixing body output 90. The mixing body output 90 is coupled to a throttle, 92, which regulates the pressure of the fuel/air mixture available for introduction into the bore 18. The throttle 92 is in turn coupled to an injection valve assembly 94. Internal components of the valve assembly 94 will be described in greater detail below.

The valve assembly 94 is then mated to the housing 12 using gasketing and attaching means known to one of ordinary skill in the art. The valve assembly is activated by valve triggers 95 mounted to the perimeter of the flywheel 50.

In one embodiment a nitrogen absorbing material or molecular sieve 83 (shown as ghost lines in FIG. 2) is installed before the mixing body 84. By way of example, the molecular sieve 83 may be installed in the path of the air conduit 76 adjacent the directionally restrictive valve 82. Other locations may produce desirable results, as long as the nitrogen absorbing material is housed in a suitable container. Depending on the porosity of the molecular sieve, it may be desirable to dispose the molecular sieve 83 at a location between the air output port 86 and the bore 18 to take advantage of the high pressure air being discharged from the air chamber 72. Alternatively, the molecular sieve 83 may be contained within the air chamber 72. The molecular sieve is configured to absorb nitrogen from the air supply, and thus increase the concentration of oxygen available for combustion. The molecular sieve 83 may utilize one of several aluminosilicate minerals known as Zeolites to absorb substantial quantities of nitrogen, leaving mostly oxygen and argon remaining.

Synchronization between the moveable cylinder head 42 and rotary piston 20 is achieved by the cooperation of a profile roller 96 and the open face profile 52. The profile roller passes through profile roller slot 98 in the housing 12, and rides against the open face profile 52 impressed into the flywheel 50. The open face profile 52 of the flywheel 50 is a scalar duplicate of the profile established by the piston face 22, and is therefore effective to pull the profile roller 96 and connected moveable cylinder head 42 into near contact with the profile of the piston face 22 as the rotary piston 20 rotates. In this embodiment, it should be noted that the open face profile 52 is only configured to direct the moveable cylinder head 42 toward the rotary piston 20, and is not configured to pull the moveable cylinder head 42 away from contacting the rotary piston 20. In one embodiment, the force of the cylinder head apex seal 61, as it is spring biased away from the cylinder head 42, is sufficient to repel the moveable cylinder head 42 and prevent contact with the rotary piston 20. As seen in FIG. 7F, the apex seal 61 is spring biased by spring 63 away from the moveable cylinder head 42 and toward the piston face 22. In this embodiment, the spring bias of the cylinder head apex seal 61 is sufficient to maintain sealing contact between the cylinder head apex seal 61 and the piston face 22, but does not significantly contribute to the repulsion of the cylinder head 42 away from the piston face 22. It should be noted that the open face profile has been shown impressed into the flywheel 50, but other rotary members, such as a disk independent from the flywheel 50, may be used.

The engine 10 contains no oil sump, and is air cooled. External contact surfaces and bearings may be greased or otherwise lubricated. Internal components may be lightly lubricated, but such internal lubrication may not be required. A plurality of flywheel compression ports 100 and flywheel cooling ports 102 move ambient air from the environment through a housing compression port 104 and a plurality of rear housing cooling ports 106, respectively. The flywheel ports 100 and 102 may be bored at an angle to more readily blow air into the housing ports 104 and 106, respectively. In one embodiment, one or more scoops 108 (shown in FIG. 5) may be added to the flywheel 50 to augment the amount of air displaced as the flywheel 50 rotates. As the flywheel 50 rotates, a high pressure region is established between the flywheel 50 and the housing 12. As will be explained in greater detail below, as the rotary piston 20 rotates, air necessary for compression enters at greater than ambient pressure through the rear housing compression port 104. The air pumping action of the flywheel 50 acts similar to a forced induction supercharger. Simultaneously, fouled air is expelled through the exhaust port 110 as the greater than ambient pressure air enters the bore. At the same time, greater than ambient pressure air is directed through the rear housing cooling ports 106, through piston cooling ports 112, and exits through lower cover cooling ports 114.

A spark plug 116 in FIG. 2 is disposed near the valve assembly 94. As used herein, a sparkplug may include any plurality of spaced electrodes configured to convey an arc (a "spark generator") across the spaced electrodes. In one embodiment, the centerlines of the spark plug 116 and valve assembly 94 are coincident when viewed from the top or the bottom of the engine 10, but other locations near the valve assembly 94 may produce acceptable results. The spark plug may be of the conventional type or a flush fitting design optimized for use in rotary engines (such as the NGK Surface Discharge™ line of products). A low-current high-voltage power supply 118 is electrically coupled to the housing 12 and the spark plug 116. The high-voltage power supply 118, may be timed to provide a spark by interaction between the flywheel 50 and a mechanical switch, optical position sensors, or other timing means known to one of ordinary skill in the art.

In one embodiment, the power supply 118 utilizes a common 9V battery (IEC 6F22, or 6LR61 type) (not shown) wherein a power oscillator converts the direct current from the battery to alternating current or pulsed direct current. A transformer (not shown) steps up the voltage between 400 and 1200 volts of alternating current. A rectifier (not shown) converts the alternating current back to direct current and stores the energy in a capacitor. A pulsing circuit (not shown) then rapidly switches the direct current on and off to a second transformer. The second transformer (not shown) multiplies the voltage to an output value ranging from approximately 25 kV to approximately 250 kV. The configuration of these low-current high-voltage generating power supplies 118 is known to one of ordinary skill in the art of stun gun defense devices. Since the low-current high-voltage power supply 118 is solid state, spark can be applied even when the engine 10 is not running. A piston positioning knob 120, in conjunction with the power supply 118, enables starter-less initiation of the engine 10, as will be explained in detail below.

Figure 3:
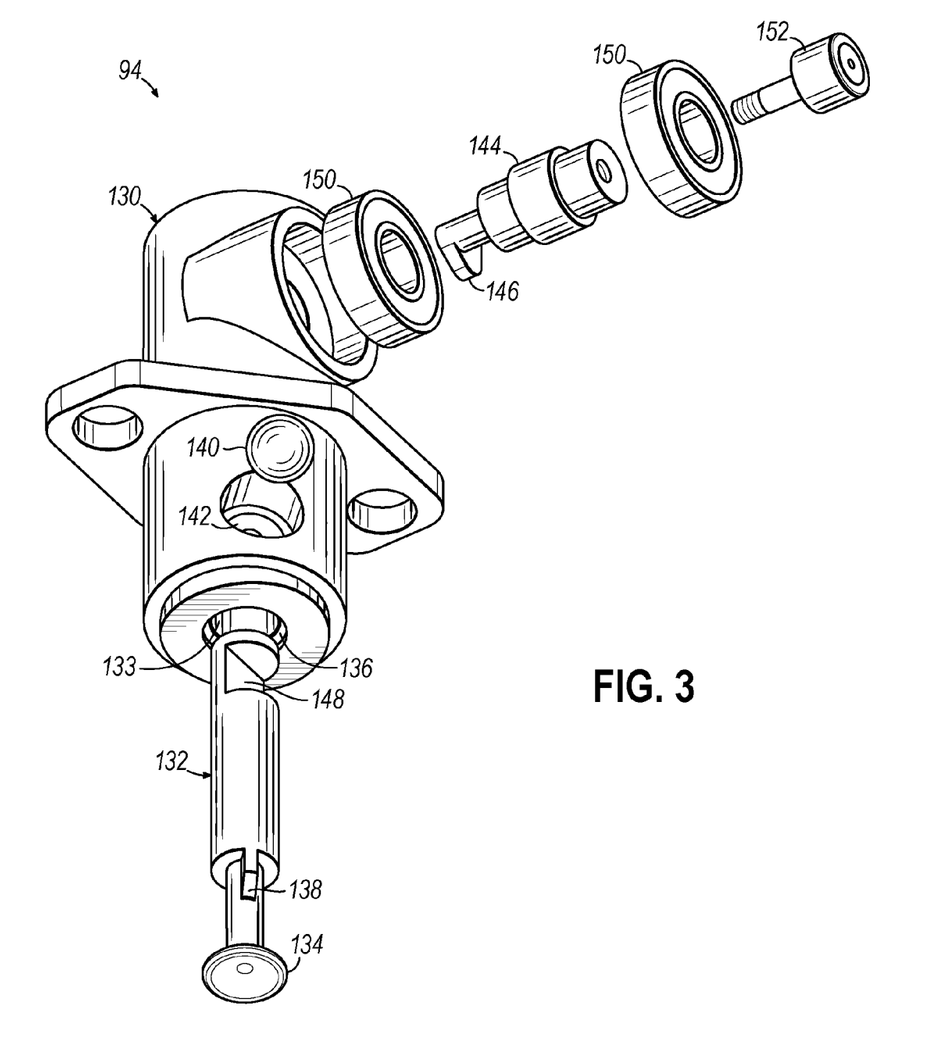
FIGS. 3 and 3A are two detailed views, isometric and cross-sectional, respectively, of an embodiment of a valve assembly in the invention of FIGS. 1 and 2.

Turning attention to FIG. 3, the valve assembly 94 shown in FIGS. 1 and 2 will now be explored in more detail. A valve body 130 is machined to receive a valve stem 132. The internal cavity resulting from the machining of the valve body 130 may be referred to as a passageway 133 (not shown in FIG. 3 but shown in FIG. 3A). At a terminal end of the valve stem 132, is a valve head 134 dimensioned to seal against a valve seat 136 of the valve body 130 as the valve stem 132 reciprocates. This interface between the valve head 134 and valve seat 136 may be referred to as a first valve portion. Proximal to the valve head 134 is a valve ramp 138 likewise configured to act upon a ball valve 140 (the ball valve is held captive, yet operationally moveable, when the valve assembly 94 is mounted in the housing 12) as the valve stem reciprocates. Air or a fuel air mixture is supplied to the ball valve 140 when mounted in the housing 12. One or more springs, not shown, may be used to bias the ball valve 140 and valve head 134 against their respective seats 142 and 136, respectfully. The ball valve 140 seals against a ball valve seat 142 when the valve ramp 138 is not applying a force to the ball valve 140, and the ball valve 140 is driven away from the ball valve seat 142 when the valve stem 132 reciprocates and drives the valve ramp 138 against the ball valve. This interface between the ball valve 140 and the ball valve seat 142 may be referred to as a second valve portion.

The reciprocating action of the valve stem 132 is driven by an actuator 144. The actuator 144 includes a lobe 146 which cooperates with a valve stem channel 148. The actuator 144 and valve stem 132 are perpendicularly mated within the valve body 130 and configured so that a rotary motion of the actuator 144, guided by one or more actuator bearings 150, causes the lobe 146 to apply a force to the valve stem in channel 148, which results in translation of the rotary action of the actuator 144 into linear action of the valve stem 132.

In one embodiment, a contact point 152 is installed opposite the end of the lobe 146, and is disposed eccentric to the center of the actuator 144 (resulting in a cam action). In this configuration, the one or more valve triggers 95 (discussed above with respect to FIG. 2) impart a torque to the actuator 144 by tangentially contacting the contact point 152. Essentially, as the flywheel 50 and valve triggers 95 move in a circular motion with respect to the axis 32, the valve triggers 95 periodically press radially outward against the contact point 152, which rotates the actuator 144 and lobe 146 (because of the eccentric mounting, or cam action, of the contact point). The lobe 146 acts upon the valve stem channel 148, which linearly translates the valve stem 132. As the valve stem 132 is linearly translated, the valve head 134 opens with respect to the valve seat 136 and the ball valve 140 is drive away from the ball valve seat 142 by the valve stem ramp 138.

The ball valve 140 and ball valve seat 142 execute distinct roles from the valve head 134 and valve seat 136. The air supplied to the ball valve (as will be seen in the discussion that follows) is of a non-trivial pressure, and the ball valve 140 is aided in being sealed against the ball valve seat 142 by the air pressure itself. Likewise, the valve head 134 is aided in being sealed against the valve head seat 136 by combustion forces in the bore 18. This self sealing occurs when the valve is "relaxed," which corresponds to the condition wherein no force is being exerted to open the valve. Given this configuration of ball valve 140 and valve head 134, one will appreciate that the passage of undesired fuel air mixture, or fouled air, is halted even in the absence of strong mechanical or spring bias structures. Therefore, the valve may be operated ("exercised") to an open configuration with lower activation forces, which will reduce the load on the engine 10 while providing extended service life of the valve 94 and contact points 152.

Figure 3A:
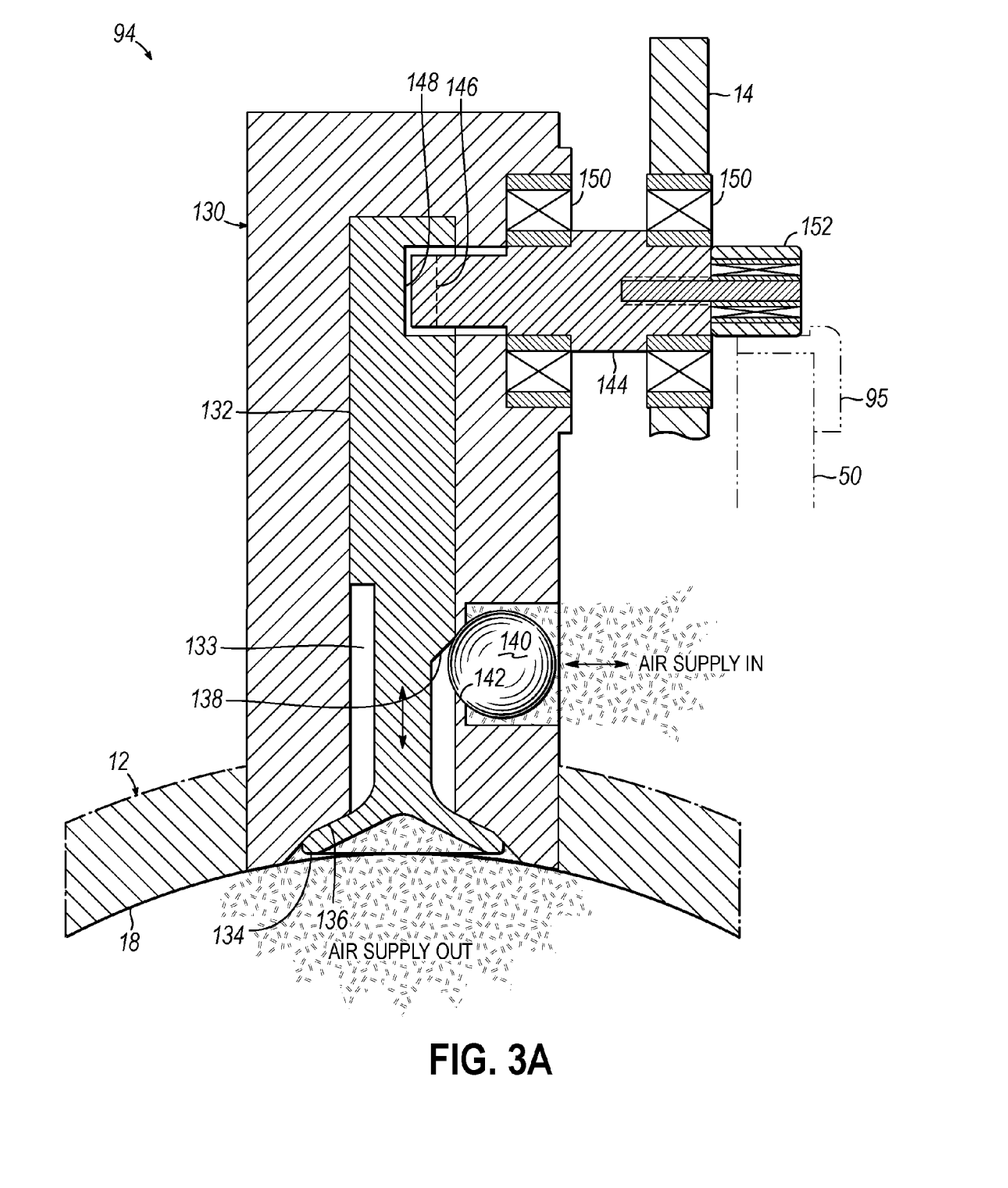

In FIG. 3A, the valve assembly 94 is show in a cross sectional view with both valve portions in the closed position (relaxed position). The valve assembly 94 is mounted in the housing 12 and is flush with the bore 18. The valve ramp 138 is nearly touching the ball valve 140, but it has not displaced the ball valve 140 away from its ball valve seat 142. Therefore pressurized air (or gaseous fuel air mixture) designated by "air supply in" cannot pass the ball valve 140 and valve seat 142 into the passageway 133. The air pressure itself is holding the ball valve 140 closed, but in some embodiments a spring may assist with sealing the ball valve 140 against the ball valve seat 142.

Likewise, the lobe 146 is not forcing the valve stem 132 in the open position, and the valve head 134 is in contact with the valve seat 136. If the valve assembly 94 were to be opened or exercised, the lobe 146 would cooperate with the channel 148 to reciprocate the valve stem 132 and therefore separate the valve head 134 from the valve seat 136. The ball valve would be simultaneously opened, as described above, and air (or fuel air mixture) would pass from "air supply in" through the passageway 133 and through "air supply out." When the valve is relaxed, and both valve portions are closed, combustion gasses pressing against the valve head 134 keep the valve head itself seated against the valve seat 136, and combustion gasses are prevented from entering the passageway 133 In some embodiments, a spring may assist with sealing the valve head 134 against the valve seat 136.

Figure 4:
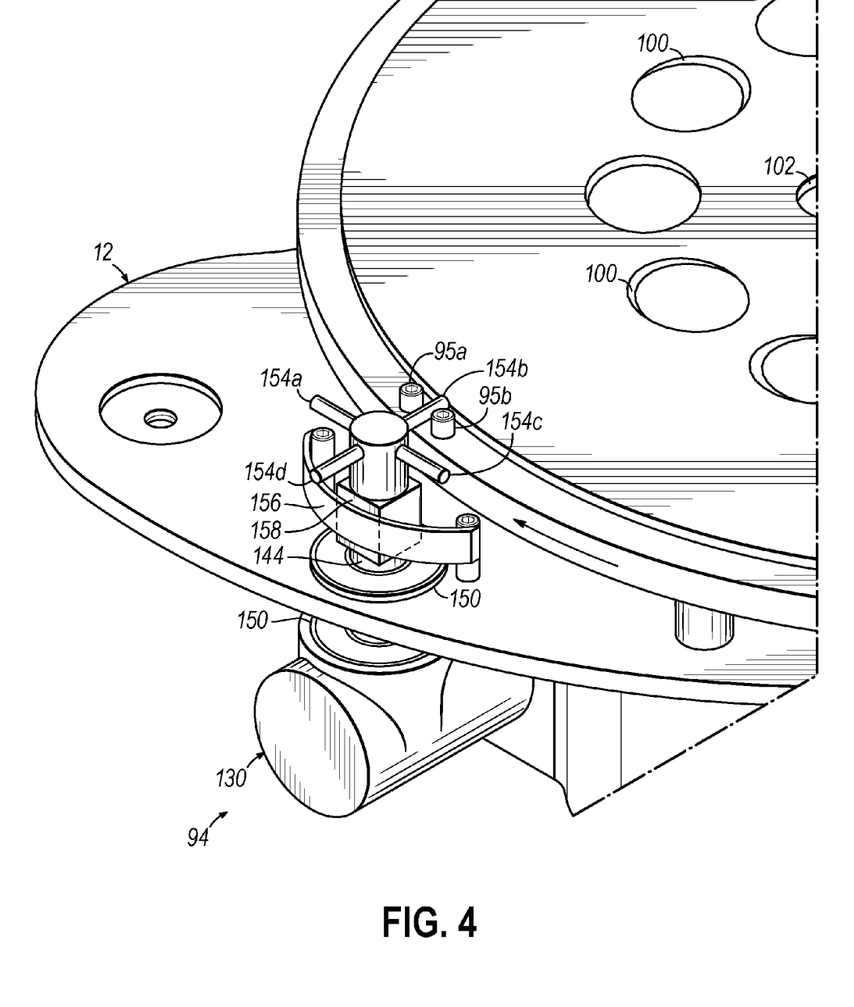
FIG. 4 is an isometric view of another embodiment of the valve assembly of FIG. 3.

With attention to FIG. 4, in another embodiment, the actuator 144 of the valve 94 may be incrementally rotated as the flywheel 50 turns. For example, a plurality of valve triggers 95a-95b may be disposed at the perimeter of the flywheel 50. The actuator 144 may include a plurality of projections 154a-154d. In this example, the lobe 146 (not shown) is configured to open the valve 94 and close the valve 94 with each ninety degree rotation of the actuator 144. Therefore, four projections 154 are used to evenly segment the actuator 144. As the flywheel 50 rotates, valve trigger 95a contacts projection 154a, and displaces it 90 degrees. This opens the valve 94. As the flywheel continues to rotate, valve trigger 95b contacts projection 154b, and displaces it an additional 90 degrees. This closes the valve 94. Projection 154c is now ready to be contacted by additional valve triggers (not shown). A detent, created by a tension spring 156 pressing upon a facet 158.

Figure 5:
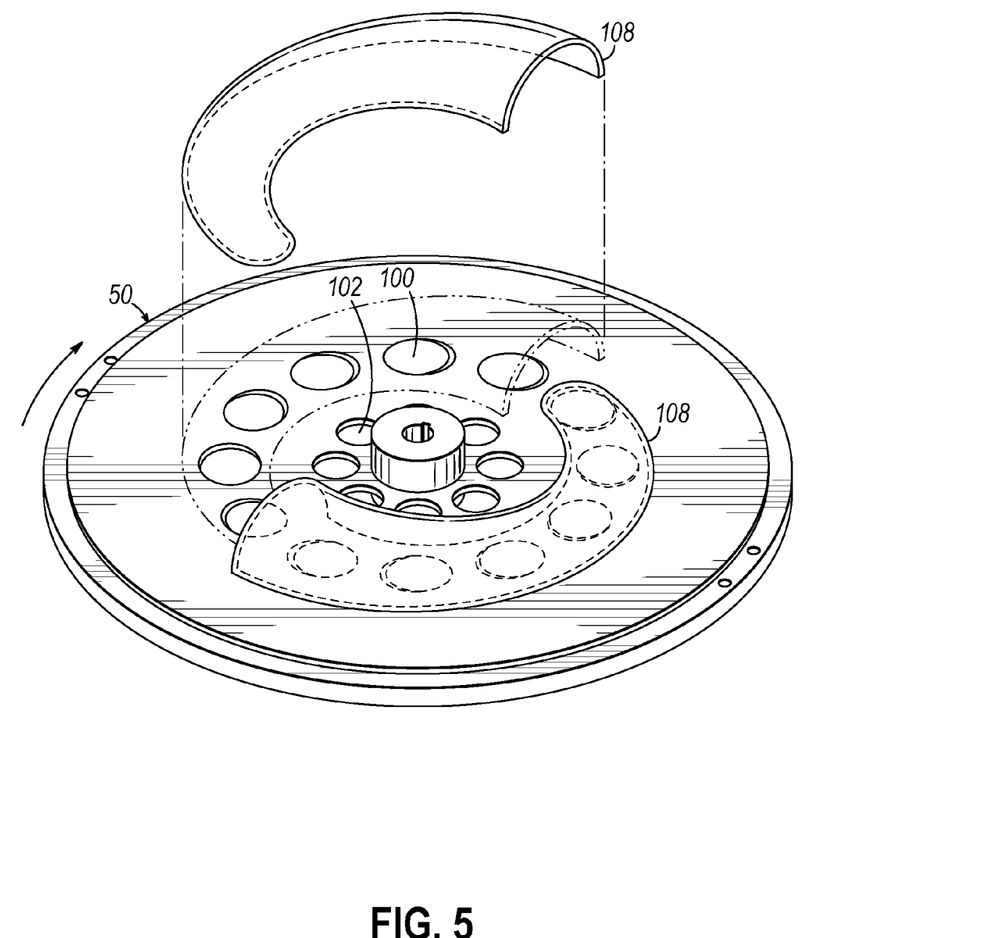
FIG. 5 is an isometric view of air directing scoops mounted to the flywheel of the invention of FIGS. 1 and 2.

FIG. 5 depicts a flywheel 50 with scoops 108 configured to enhance the movement of air from one face of the flywheel 50, through the flywheel compression port 100 and flywheel cooling ports 102, to the other face of the flywheel 50, and ultimately into the housing compression port 104 and housing cooling ports 106.

Figure 6:
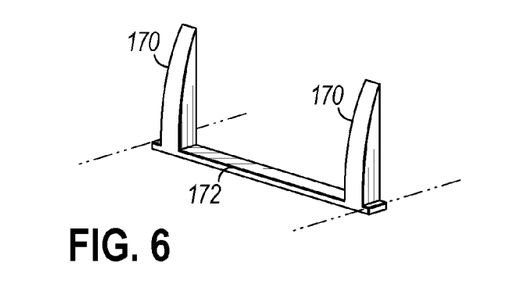
FIG. 6 is an isometric view of an embodiment of the apex seal of the invention of FIGS. 1 and 2.

FIG. 6 depicts the design of the apex seals 58. Traditional apex seals experience accelerated wear as they pass over the opposing cylinder head apex seal 61. This accelerated wear is caused by shearing forces as one seal (having a generally rectangular cross section) shears over the opposing seal (having a generally rectangular cross section). Under certain circumstances, traditional seals may allow catastrophic failure to occur. For example, as parts wear, the clearance between the piston face 22 and moveable cylinder head 42 may increase. If an unacceptably large portion of the seal protrudes from either the piston face 22 or the cylinder head 42 (in response to the large gap between the piston face 22 and the cylinder head 42), one seal may tear the opposing seal from its mounting channel. The dislodged seal may then completely jam and disable the engine 10. To prevent this condition, the apex seals 58 include a pair of ramped legs. As shown, the ramped legs 170 have a curved or radiused profile, however linear ramped legs 170 may produce acceptable results at various angles. The ramped legs 170 precede the seal edge 172 and are acted upon by the leading edge of the moveable cylinder head 42 (or other obstruction) and cylinder head apex seal 61.

The method of operation and mechanical interaction of the various components will be discussed below. In general, the engine 10 is capable of operating on a wide variety of gaseous and liquid fuel sources. Several of the mechanical elements described above result in improved simplicity, longevity, and efficiency.

First, the engine 10 is air-cooled and is exclusively externally lubricated. The air-cooled engine 10 is permitted to operate at a relatively high steady state temperature, thereby eliminating the need for pumps and fluid passageways common to liquid-cooled engines. The engine is therefore less complicated, and no horsepower is sacrificed by driving a water pump. The elevated operating temperature also allows for more complete combustion of fuel and less potential energy being wasted as evacuated heat. All bearings and contact points necessitating lubrication are external to the bore, and are sufficiently air-cooled as well.

The straight shaft rotary engine 10 is highly efficient and has an advantageous size to weight ratio for several reasons. The design of the engine 10 includes a pressurized air chamber 72 that is continuously replenished by the operation of the rotary piston 20. In one embodiment, the air chamber 72 maintains a pressure of approximately 75 PSI, while larger embodiments may exceed 100 PSI. This allows an extremely large mass of fuel air mixture to be introduced for combustion in a very short amount of time. In one embodiment, approximately 8 in$^3$ of (ambient pressure and temperature) air is introduced into an expansible chamber volume of approximately 1.5 in$^3$ in approximately 10 ms. Therefore, the relatively small engine 10 can perform the same mechanical work of much larger and more massive engines. Further, the engine 10 is capable of more than one combustion event per revolution, and the straight shaft rotary piston 20 converts combustive forces directly into a torque (contrary to a reciprocating piston engine, which must inefficiently translate the reciprocating piston motion into rotary action of the cam shaft near top dead center). It should be noted that during periods of low load, the engine 10 may be configured to function with fewer than the maximum conceivable combustion events per rotation. This serves to reduce fuel consumption when the engine 10 is under low power demands.

Additionally, the optimal stoichiometric ratio of air to selected fuel type is preset by the mixing body 84 (or by appropriate direct injection of liquid fuels). The optimal fuel air ratio is therefore maintained through both low and high rpm operation of the engine 10, and the throttle 92 is a restrictive valve that meters the molar quantity of a fixed ratio fuel/air introduced into the combustion region of the bore 18.

The pressurized air chamber 72, in conjunction with the low-current high-voltage solid state ignition system allows for a starter-less initiation of the engine. Once the air chamber 72 is pressurized and the piston is parked at an appropriate location (using the piston positioning knob 120 or automated means), the engine may be started simply by opening the valve assembly 94 and initiating spark. In one embodiment, the valve assembly 94 is temporarily disabled. The valve is disabled by prohibiting the valve triggers 95 from acting upon the actuator 144. This prevents premature discharge of pressure from the air chamber 72. A user then rotates an external knob to manually position the rotary piston 20 at top dead center. A starting mechanism simultaneously opens the valve assembly 94 and initiates spark. No pull cord, nor starter motor, is necessary. This provides substantial fuel efficiency benefits as well because the engine may be stopped and instantly started during periods of engine inactivity (which would previously necessitate unproductive idling). It should be noted that the directionally restrictive valve 82, in conjunction with the valve assembly 94, should be sufficient to maintain pressure in the air chamber 72 even during prolonged storage. If the air chamber 72 should become discharged, as a result of a minor leak or after disassembly or repair, it is calculated that operating pressure can be reestablished by manually rotating the rotary piston 20 approximately ten revolutions.

Figure 7A:
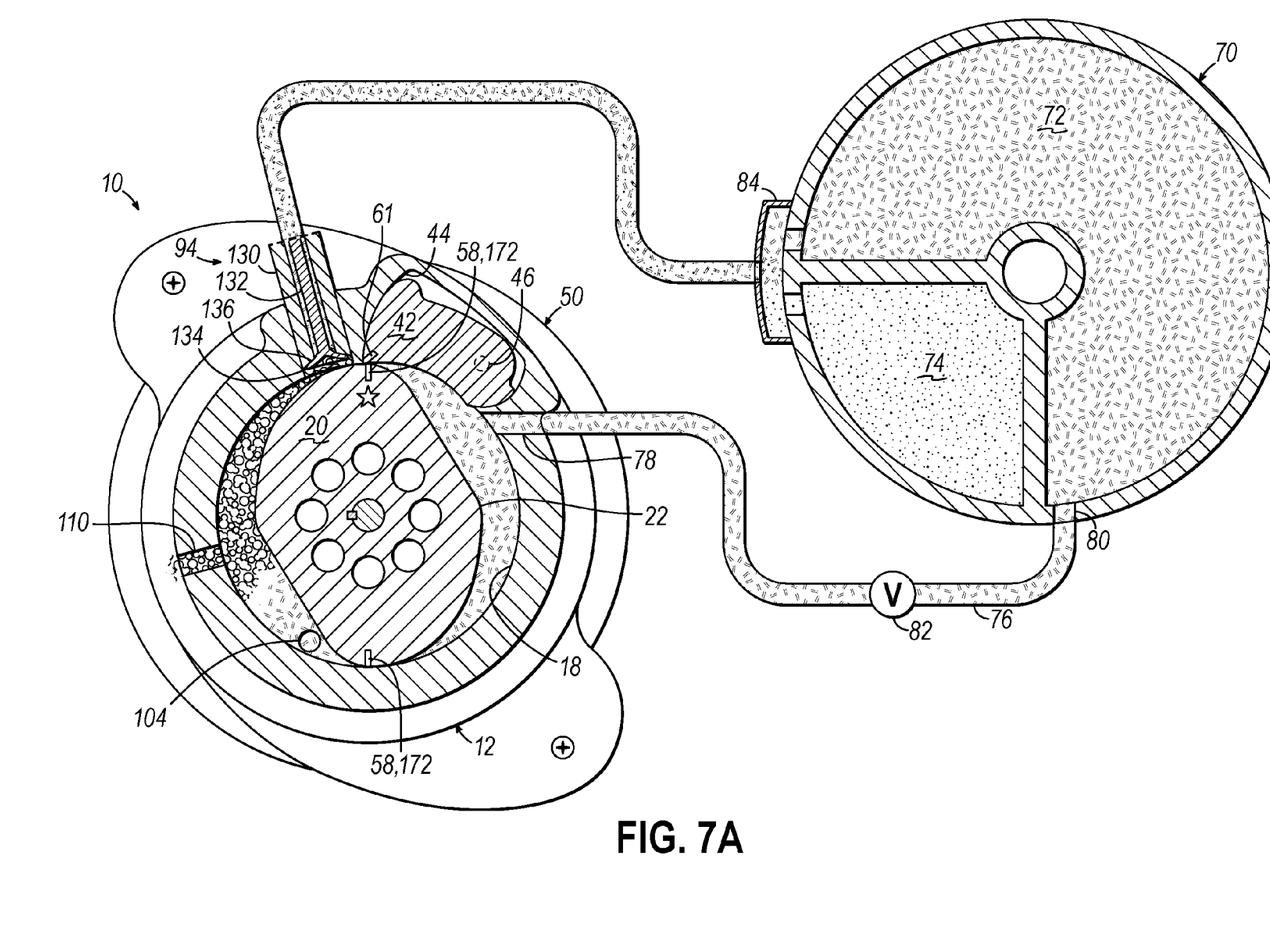
FIGS. 7A-7E depict various stages of operation of the invention of FIGS. 1-6.

Turning attention to FIG. 7A, the engine 10 is shown at an arbitrary starting position wherein a witness mark (denoted by a star) is approximately at the 12 o'clock position. In the discussion that follows, it will be noted that the rotary piston 20 is symmetric and is fired upon twice per revolution. Therefore, a given portion of the rotary piston 20 may be subjected to combustion forces at one moment in time, while serving as a means for compressing air at another moment in time. Therefore, the side of the rotary piston 20 in contact with fuel or combustion products (in this view, generally the left hand side of the bore 18) will be designated the "front side" of the piston face 22, and the side of the rotary piston 20 used for compression (in this view, generally the right side of the bore 18) will be referred to as the "back side" of the piston face. In the view shown, the rotary piston 20 rotates counterclockwise.

Here we see that one of the apex seals 58 of the rotary piston 20 is about to pass the cylinder head apex seal 61. The moveable cylinder head 42 is in near-contact with the piston face 22. The seal legs 172 (not shown) of the apex seal 58 are being contacted by the cylinder head apex seal 61, thereby displacing the apex seal 58 into the piston face 22 and allowing the seal edge 172 to safely pass the cylinder head apex seal 61. The valve head 134 is sealed against its valve seat 136, and the ball valve 140 (not shown but described in detail above in FIG. 3) is preventing air from the air chamber 72 and fuel from the fuel chamber 74 from entering the bore 18. The void formed between the bore and the front face of the rotary piston 20 (left side) is partially full of fouled air, while the balance of the fouled air is evacuated through the exhaust port 110 aided by incoming fresh air (at above ambient pressure) through the housing compression port 104. The back side of the rotary piston 20 (right side) is charged with fresh air (originally introduced at above ambient pressure), and further undergoes compression as the other apex seal 58 (the "non-witness mark" seal at 6 o'clock) compresses the volume of air against the moveable cylinder head 42, out of the compression output port 78, past the directionally restrictive valve 82, and into the compression input port 80 of the air chamber 72. The momentum of the flywheel 50 will carry the rotary piston 20 to the next position.

Figure 7B:
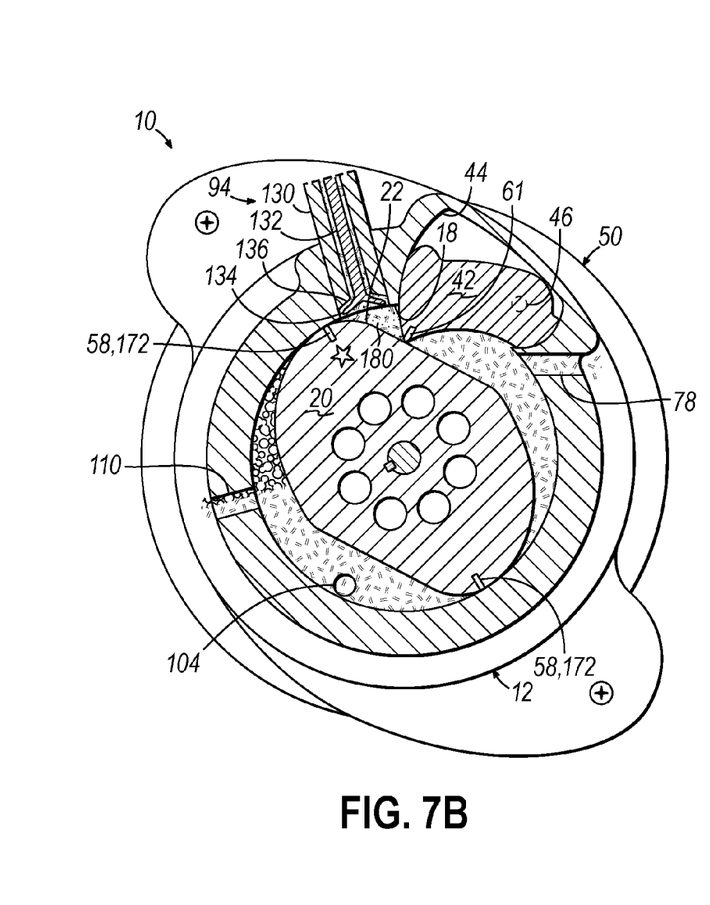

Turning to FIG. 7B, the witness mark apex seal 58, piston face 22, bore 18, and moveable cylinder head 42 form an expansible combustion chamber 180. The valve assembly 94 opens in this view, and a fuel air mixture, at optimal ratio, is introduced into the expansible combustion chamber 180. The conditions experienced at the front and back of the rotary piston 20 in FIG. 7A are substantially the same in this view. The void adjacent the front side of the rotary piston 20 has a portion of fouled air, and a balance of fresh air. Additional fresh air (at above ambient pressure) continues to enter through the housing compression port 104, and the witness mark apex seal 58 directs additional quantities of the fouled air out of the exhaust port. Likewise, as in FIG. 7A, the void adjacent the back side of the piston continues to compress additional air into the air chamber 72 (not shown, but depicted in FIG. 7A). As before, the momentum of the flywheel 50 rotates the rotary piston 20 to the next position.

Figure 7C:
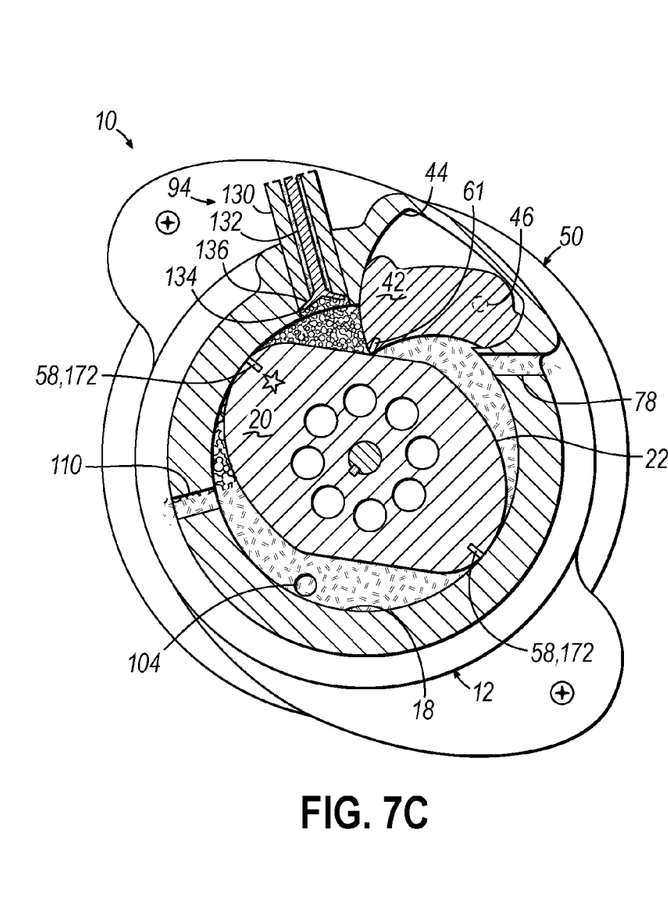

In FIG. 7C, the valve assembly 94 closes and a spark initiates combustion. This configuration can be best analogized to "top dead center" of a reciprocating piston engine. The geometry and volume of the expansible combustion chamber 180 change as the expanding combustion products drive the rotary piston 20 counterclockwise. The rotary piston 20 is under full power, until such time as the witness mark apex seal 58 passes the exhaust port 110. Prior to the witness mark apex seal 58 passing the exhaust port 110, the witness mark apex seal ushers out the final quantities of fouled air (from the ignition event that occurred before FIG. 7A), while the back side of the rotary piston 20 adds additional air volume to the air chamber 72 (not shown, but depicted in FIG. 7A). Expanding combustion products in the expansible chamber 180 drive the rotary piston 20 to the next position.

Figure 7D:
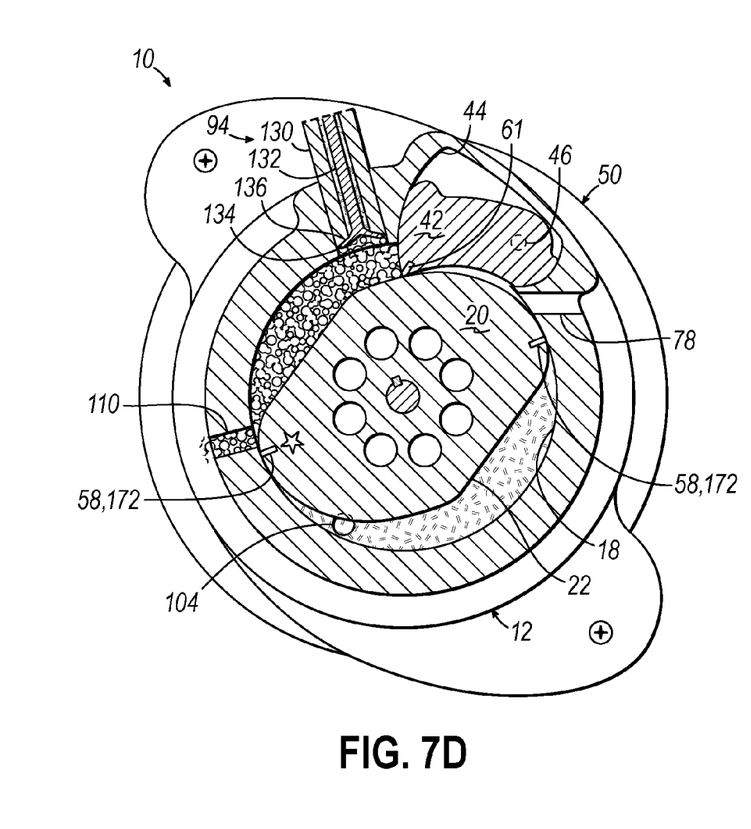

FIG. 7D shows that the witness mark apex seal 58 has passed the exhaust port 110, and the fouled contents of the expansible chamber 180 have been vented to the environment. The volume of the expansive combustion chamber 180 is now substantially equal to ambient pressure. That same volume is completely filled with fouled air, and no fresh air is yet available to purge or replace the fouled air. Fresh air continues to enter the housing compression port 104, but the non-witness mark apex seal 58 has not yet passed the compression output port 78. Therefore, while the void adjacent the housing compression port 104 is filled with fresh air at above ambient pressure, the air will not be compressed into the air chamber 72 until such time as the non-witness mark apex seal 58 has passed the compression output port 78. The momentum of the flywheel 50 rotates the rotary piston 20 to the next position.

Figure 7E:
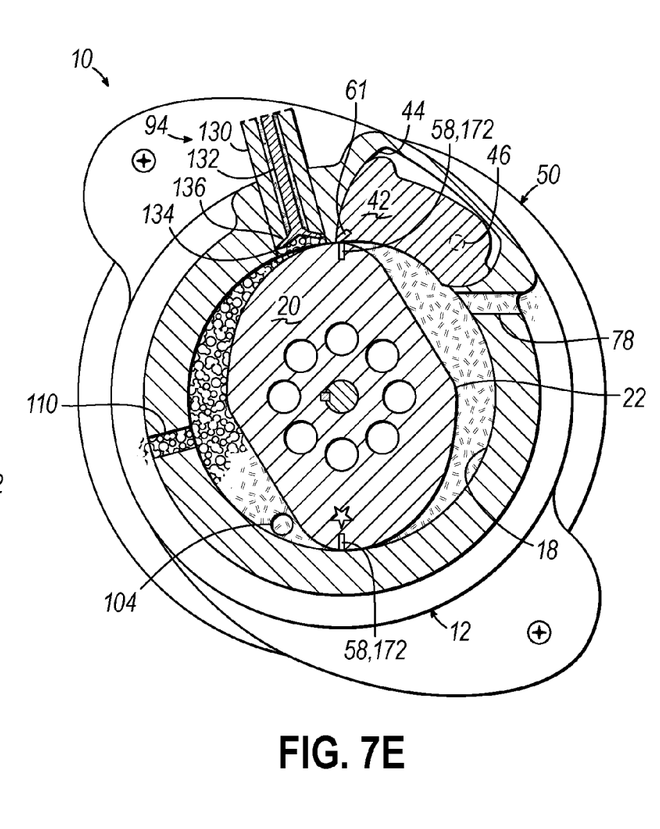
Figure 7F:
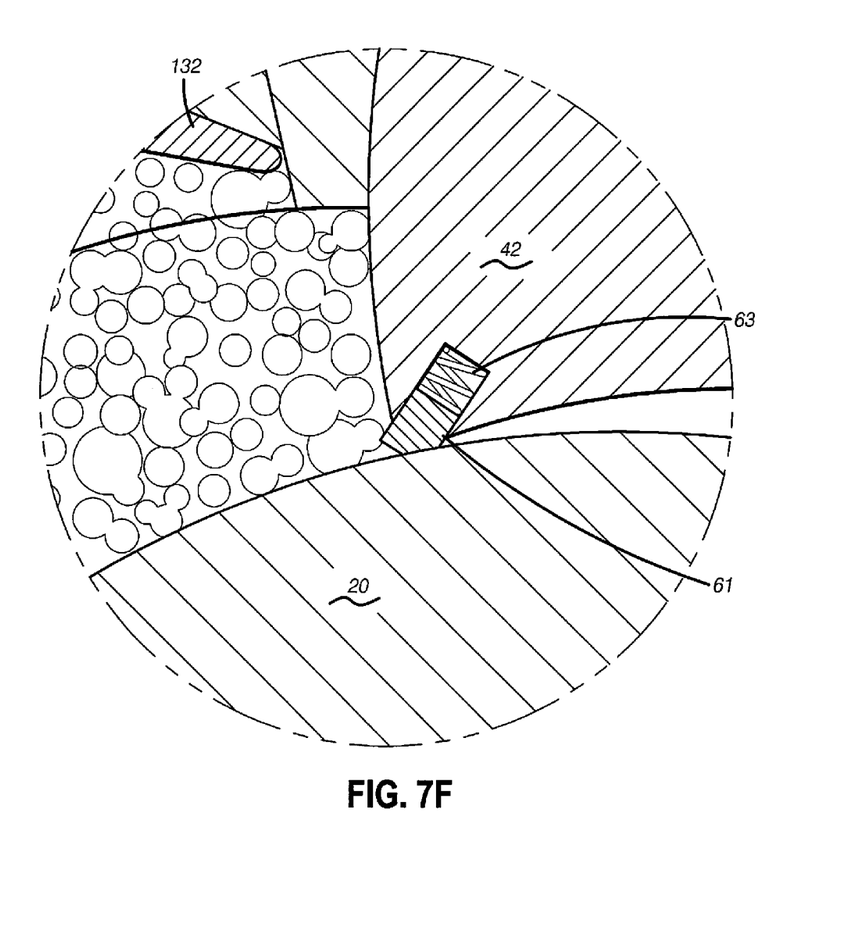
FIG. 7F is a magnified view of the interaction of the apex seal of the moveable cylinder head with the piston face due to the use of a spring.

In FIG. 7E, the cycle repeats as seen in FIG. 7A.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the scope of the general inventive concept and claims.

What is claimed is:

1. A straight shaft non-planetating rotary piston engine including:
   a housing;
   a rotating piston mounted for circular rotation about an axis within said housing, said rotating piston having a piston face defining a face profile;
   said rotating piston and said housing defining an expansible combustion chamber configured to produce at least one combustion event for every rotation of said piston about said axis;
   a moveable cylinder head having a profile roller and an apex seal, said profile roller cooperating with an open face profile impressed into a rotary member,
   wherein said open face profile is configured as a scalar duplicate of said face profile to drive said cylinder head toward said piston face and provide sealing contact between said apex seal and said rotating piston at all times during rotation of said rotating piston, and said apex seal is spring biased to repel said moveable cylinder head away from said piston face.

2. The engine of claim 1, wherein said piston and said housing define an expansible combustion chamber configured to produce at least two combustion events for every rotation of said piston about said axis.

3. The engine of claim 2, wherein at least one of said at least two combustion events is disabled to conserve fuel.

4. The engine of claim 2, wherein said moveable cylinder head is constrained to a linear motion.

5. The engine of claim 2, wherein said moveable cylinder head is constrained to a pivoting motion.

6. The engine of claim 5, wherein said apex seal is spring biased by an apex seal spring.

7. The engine of claim 1, further comprising:
   an air chamber configured to contain pressurized air, wherein air of said pressurized air chamber is pressurized by the rotary action of said piston;
   a fuel chamber configured to contain fuel;
   a mixing body fluidically coupled to said air chamber and said fuel chamber and configured to maintain a stoichiometrically optimized ratio of said fuel to said air; and a throttle, wherein said throttle is configured to regulate the mass and volume of said fuel and said air supplied to said expansible combustion chamber while maintaining said stoichiometrically optimized ratio.

8. The engine of claim 7, further including a flywheel having compression ports, wherein said rotating flywheel augments said pressurization of air by said piston into said air chamber.

9. The engine of claim 8, wherein said flywheel further includes scoops configured to force additional air into said compression ports.

10. The engine of claim 7 wherein the air supplied to said expansible combustion chamber includes nitrogen at a first percentage and oxygen at a second percentage;
   the engine further comprising a nitrogen absorbing material disposed in a container fluidically coupled to said expansible combustion chamber, such that said air passes through said nitrogen absorbing material prior to entering said expansible combustion chamber; and
   wherein said nitrogen absorbing material is operable to reduce said first percentage of said nitrogen to a third lower percentage and to increase said second percentage of said oxygen to a fourth higher percentage of said oxygen.

11. The engine of claim 10 wherein said nitrogen absorbing material is a Zeolite mineral.

12. The engine of claim 1 including electrodes disposed in said expansible combustion chamber; and
   a spark generator electrically coupled to said electrodes and comprising a low-current high-voltage power supply energized by a direct current electrical source of less than or equal to approximately 9 volts.

13. The engine of claim 12 wherein said power supply is configured to provide pulsed direct current in excess of 50,000 V.

14. The engine of claim 12 wherein said spark generator is configured to energize said power supply when said piston is rotated to a designated angular position.

15. The engine of claim 12 wherein said spark generator is configured to continuously energize said power supply while said engine is running.

16. The engine of claim 1, further comprising:
   a rotating piston apex seal extending from said piston face of said rotating piston to engage said apex seal of said moveable cylinder head during rotation of said rotating piston;
   said rotating piston apex seal having one or more ramped legs disposed in advance of a sealing edge of said rotating piston seal;
   said one or more ramped legs displacing said rotating piston apex seal and said sealing edge upon engagement with said apex seal of said movable cylinder head.

17. The seal of claim 16 wherein said one or more ramped legs are configured with a linear ramped geometry.

18. The seal of claim 16 wherein said one or more ramped legs are configured with a radiused ramp geometry.

19. The engine of claim 1, further comprising:
   a valve communicating with the expansible combustion chamber, the valve comprising:
      a passageway fluidly coupling a first valve portion to a second valve portion,
   wherein said first valve potion is configured to oppose the entry of air for use in combustion into said passageway from a first direction when said valve is relaxed,
      and wherein said second valve portion is configured to oppose the entry of combustion products into said passageway from a second direction when said valve is relaxed; and
   wherein said first valve potion is configured to allow the entry of air for use in combustion into said passageway from a first direction when said valve is exercised,
      and wherein said second valve portion is configured to allow the passage or air for use in combustion in said first direction when said valve is exercised.

\* \* \* \* \*